Feb. 20, 1940.   E. DOCKEN   2,191,274
ANIMAL TRAP
Filed July 15, 1939

INVENTOR.
EINAR DOCKEN.
BY
ATTORNEY.

Patented Feb. 20, 1940

2,191,274

UNITED STATES PATENT OFFICE 2,191,274

ANIMAL TRAP

Einar Docken, Ottawa, Ontario, Canada

Application July 15, 1939, Serial No. 284,679

9 Claims. (Cl. 43—83.5)

This invention relates to animal traps and is designed for the purpose of trapping rats, mice or other animals.

One of the objects of the present invention is to provide a device of this character which automatically locks itself in a sprung position and is automatically released when the trap is operated for setting purposes.

Another object of the invention is to provide a device of this character wherein the trap may be set without the operator being required to touch the setting jaw with his hand.

A further object of the invention is to provide a structure of this character which is simple to operate, rugged in nature and one that will the more satisfactorily perform the functions required of it.

Having regard to the foregoing and other objects and advantages which will become apparent as the description proceeds, the inventions consists essentially of the novel combination and arrangement of parts hereinafter described in detail and illustrated in the accompanying drawing in which.

Figure 4:
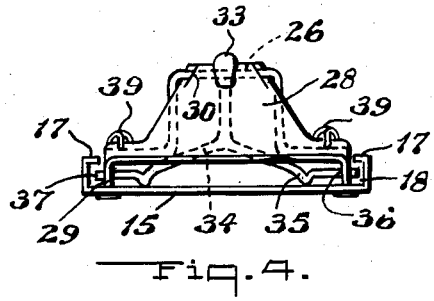
Fig. 4 is an elevation looking at the trap from the rear end.
Figure 1:
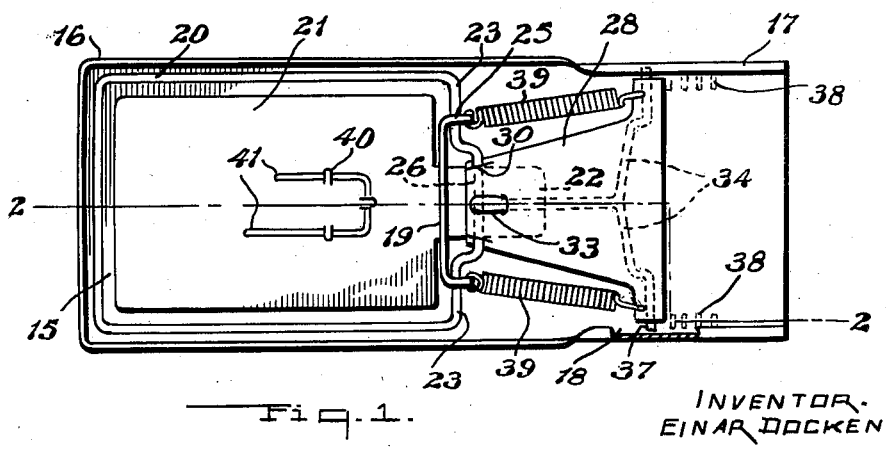
Fig. 1 is a view of an animal trap seen in plan view and disclosing an embodiment of my invention.

Referring now to the drawing in which like numerals of reference designate corresponding parts in the various illustrations, the numeral 15 indicates a trap base which may be constructed of metal or other suitable material and is preferably provided with upturned edges 16. The rear end portions of the upturned sides of the base are preferably in-turned as indicated at 17 to form channel-like guides 18 as will be seen in Figs. 1 and 4.

Substantially midway of the trap length a suitable portion of the base is struck and bent upwardly to form a central support 19. This support is designed to pivotally carry the jaw member 20 as well as the platform or treadle member 21. The platform 21 it will be seen is provided with an integral extension which provides a trigger member 22.

The jaw member 20 comprises a length of suitable material designed to skirt the front and side edges of the platform 21 and has its sections 23 turned inwardly toward each other where they engage recesses 24 formed in the wings 25 of the member 19 for pivotal support, then extend upwardly at an angle and then horizontally to form an inverted U shaped extension arm 26 for the member 20.

Pivotally connected to the upper extremity of the arm 26 is the trap setting member 28. This member may take any suitable form and in the present instance I have shown it in the form of a plate member formed with downwardly turned leg sections 29. The nose portion of the trap setting member may be split as indicated at 30 to embrace and pivotally connect the trap setting member 28 with the upper end of the extension arm 26.

Figure 2:
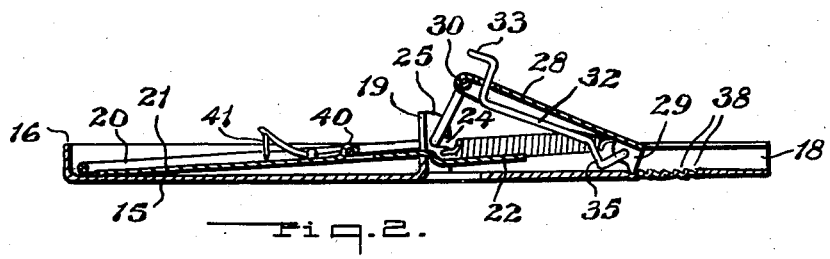
Fig. 2 is a section taken on the line 2—2 of Fig. 1 showing the trap in a sprung position.

An important feature of the present invention is the releasable locking means for locking the jaw in a sprung position and for releasing the locked jaw when setting is required. This releasable locking means includes a release arm 32 provided with operating plunger 33 which extends through the member 28 and spaced arm members 34 formed with eccentric portions 35 which terminate as pivotal mountings 36 in the downturned arm sections 29 and extend therethrough as at 37 to provide means for preventing the trap setting member from becoming disengaged from guiding channels 18 of the trap base. The leg sections 29 are shaped to suitable form and are adapted to engage indentations or the like 38 of an appropriate character which may conveniently be imposed upon the base of the trap. (See Figs. 1 and 2.)

From the description thus far given it will be seen that when the lower extremities of the leg sections 29 engage the indentations 38, upward swing of the jaw 20 is prevented as well as downward movement of the trap setting member 28. In addition to the foregoing the arrangement of the indentations 38 in series is such that locking of the jaw 20 may be effected in various sprung positions, thus a larger or smaller animal will be securely gripped in the viselike jaw of the trap and will be unable to free itself.

The release of the locking means is both novel and simple and is effected by placing the thumb of the operator upon the release plunger and exerting a slight downward pressure. Such pressure through the eccentrics 35 moves the leg sections 29 upwardly out of locking engagement with the indentations 38 and releases the trap setting member as well as the jaw member 20 (see Fig. 5).

Means for actuating the trap comprise spring members 39 which are secured to an appropriate part of the member 28 toward its rear end, and to the support member 19. With the springs thus secured a pressure is exerted upon the jaw member or striker 20 as well as the trap setting member 28 whether these elements be in a sprung or set position.

Bait holding means may take any suitable form and in the present instance I have shown a length of suitable material held in position by loops 40 struck from the platform 21 which terminates in bait holding prongs 41.

Figure 5:
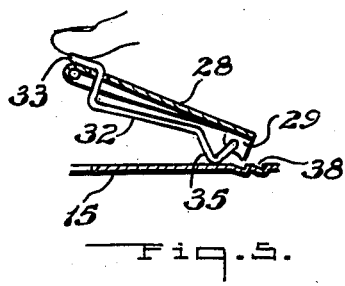
Fig. 5 is a detail showing the jaw locking member in released position.

When it is desired to set the trap by hand, the thumb of the operator is placed upon the release plunger 33 after which a downward pressure is exerted which, as observed in Fig. 5, releases the leg sections 29 from locking engagement with the base 15. A continued down pressure will then cause the member 28 to move downwardly and rearwardly with a somewhat swinging motion carrying therewith the extension arm 26 which in turn raises the jaw member 20.

Figure 3:
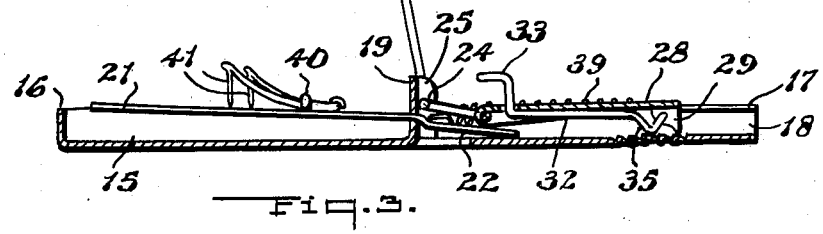
Fig. 3 is a sectional view similar to Fig. 2 showing the trap in a set position.

A continuation of this downward movement which may aptly be described as the "setting action", will cause the members 20 and 28 to assume the positions shown in Fig. 3 in which the springs 39 are extended and under tension, the nose of the trap setting member 28 is in engagement with the trigger 22, the platform 21 moves to an elevated position ready for a tripping operation while the jaw 20 becomes raised to a trap set position. During this operation the leg sections 29 are held out of engagement with the indentations 38 of the base while extensions 37 ride the channels 18 preventing displacement and serving as a guide during movement of the member 28.

When the trap has been set it will be observed that the axis of the pivotal connection of the extension arm 30 with relation to the front and rear connections of the springs 39 is at or slightly beyond dead center as defined by such spring end connections. In this position then the nose of the trap setting member is in engagement with the trigger member 22 and the trap is ready for springing. If necessary the tail of the trigger member may be curved slightly according to requirements to insure a most critical setting and at the same time guard as a means to prevent oversetting the trap.

When it is desired to set the trap other than by hand the operator simply places his foot upon the release plunger 33 which releases the locking means after which a continued foot pressure completes the setting operation as previously described.

Tripping of the trap occurs with a slight pressure downward upon the treadle or platform 21. Such pressure moves the trip trigger 22 upwardly together with the nose of the trap setting member where just off dead center the spring members 39 are instantly brought into action and snap the jaw to a closed position. The nose of the trap setting member is relatively close to the pivotal point of the platform 21 when in set position thus the trap is rendered more sensitive to animal tripping and is sprung with slight pressure upon the platform or treadle 21.

The invention disclosed may be embodied in other specific forms without departing from the spirit or essential characteristics of the invention and the present disclosure is therefore to be considered in all respects as illustrative rather than restrictive and all changes coming within the meaning and range of equivalency of the claims are intended to be embraced therein.

What I claim and desire to secure by Letters Patent is:

1. In an animal trap, a base member, a jaw member pivotally mounted in the base and provided with an extension arm, a bait holding platform, a trap setting member pivotally connected to the extension arm of the jaw member adapted to form a locking medium between the extension arm and the base to releasably lock the jaw member in a sprung position, operable means for releasing the trap setting member from engagement with the trap base, trigger means associated with the bait holding platform adapted to trip the trap and spring means for actuating the trap.

2. In an animal trap, a base member, a jaw member pivotally mounted in the base and provided with an extension arm, a bait holding platform, a trap setting member mounted rearwardly of the jaw member pivotally connected to the extension arm of the jaw member and adapted to form a medium for setting the trap, the said trap setting member being adapted to set the trap at substantially dead center as defined by the axis of the pivotal connection of the said trap setting member and to lockingly engage the trap base to lock the jaw member in a sprung position, trigger means operable by the bait holding platform adapted to move the trap setting member from its pivotal axis to trip the trap and spring means for actuating the trap.

3. In an animal trap, a base member, a jaw member pivotally mounted in the base and provided with an extension arm, a pivotally mounted bait holding platform provided with a trigger for tripping the trap, a trap setting member pivotally connected to the extension arm of the jaw member and adapted to engage the trap base, lock engaging means formed in the trap base adapted to be engaged by the trap setting member to releasably lock the said jaw member in a sprung position and spring means for actuating the trap and for releasably retaining the trap setting member in engagement with the lock engaging means in the trap base.

4. In an animal trap, a base member, a jaw member pivotally mounted in the base and provided with an extension arm, a pivotally mounted bait holding platform, a trap setting member mounted rearwardly of the jaw member and pivotally connected with the extension arm of the said jaw member, the said trap setting member being adapted to be set a slight degree beyond dead center as defined by the axis of the pivotal connection of the said trap setting member, trigger means operable by the bait holding platform for tripping the trap, release means for releasing the trap setting member from engagement with the trap base prior to trap setting and spring means for actuating the trap.

5. A device as set forth in claim 4 in which the setting of the trap a slight degree beyond dead center is regulated by the engagement of the trap setting member with the trigger means and of the trigger means with the trap base.

6. A device as set forth in claim 3 in which the lock engaging means is in the form of a series of indents in the trap base.

7. In an animal trap, a base member, a jaw member pivotally mounted in the base member and provided with an extension arm, a bait holding platform, a trap setting member pivotally connected with the extension arm adapted to form a medium for setting the trap and for forming a locking medium between the extension arm and the trap base to releasably lock the jaw member in a sprung position, release means for releasing the trap setting member from engagement with the trap base simultaneous with the operation of the trap setting member, trigger means operable by the bait holding platform adapted to trip the trap and spring means for actuating the trap.

8. In an animal trap, a base member, a jaw member pivotally mounted in the base and provided with an extension arm, a trap setting member pivotally connected with the extension arm of the jaw member adapted to form a medium for setting the trap and for forming a medium for locking the extension arm to releasably lock the jaw member when in a sprung position, a bait holding platform, leg sections associated with the trap setting member adapted to lock the said trap setting member in engagement with the base member, a release member associated with the trap setting member adapted to release the leg sections from engagement with the base member simultaneous with the trap setting operation of the trap setting member, trigger means operable by the bait holding platform for tripping the trap and spring means for actuating the trap.

9. A device as set forth in claim 8 in which the release means includes operable arm members pivotally mounted in the trap setting member provided with eccentric members.

EINAR DOCKEN.